Patented Mar. 31, 1931

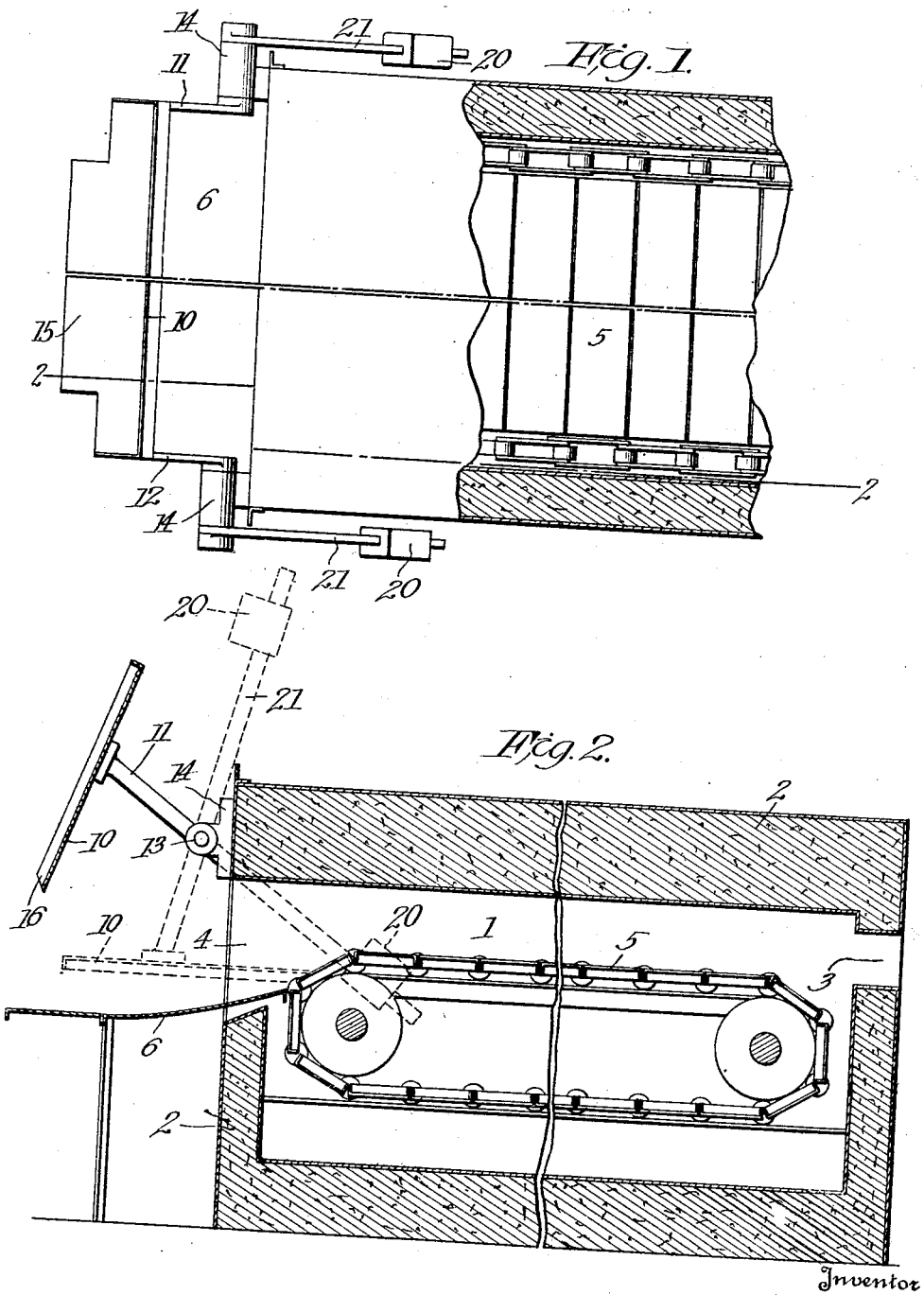

1,798,657

UNITED STATES PATENT OFFICE

CORRY B. COMSTOCK, OF NEW YORK, N. Y.

DELIVERING DEVICE FOR BAKERS' OVENS

Application filed June 28, 1928. Serial No. 288,980.

The present invention relates to improvements in delivering devices for bakers' ovens, particularly of the type wherein the articles being baked are transported through a baking chamber and to a delivery opening in an end wall thereof by an endless conveyor.

It is customary to provide at the delivery opening of such ovens an inclined slide or discharge device onto which the baked articles are automatically discharged as the conveyor travels around the supporting sprockets located adjacent such openings.

While such a discharge means is entirely satisfactory when the oven is employed for baking bread, it is somewhat objectionable when the oven is used for baking other articles, for example, rolls, pies, cakes, cookies, etc.

The object of the present invention is to provide an auxiliary delivery device comprising a substantially horizontal plate or support onto which the baked articles will be automatically delivered by the conveyor, and which device may, when the oven is used for baking such articles as pies, cakes, etc. be positioned above the inclined discharge device, above referred to, and, which, when not in use, may be supported in a position outside the oven entirely out of the path of articles delivered to said inclined discharge device.

By the invention, it is possible to automatically discharge pans of rolls, cakes, pies, etc. from the conveyor without imparting any substantial jar to such articles, which is frequently experienced when they are delivered from the oven by the inclined discharge device commonly provided.

An embodiment of the invention is illustrated in the accompanying drawing, in which Figure 1 is a plan of an oven provided with the present improvements, a portion of the top being removed and portions of the side walls shown in horizontal section.

Figure 2 is a sectional view substantially on the line 2—2 of Figure 1.

Referring to the drawing, in both views of which like reference characters designate corresponding parts, the invention is shown as applied to an oven of a type now quite common, in which the walls of the baking chamber 1 are formed of metal plates supported and connected by angle irons and including an intermediate packing 2 of heat resisting material.

As is customary, the end walls of the oven are provided respectively with an inlet or feed opening 3, and a delivery opening 4, and the articles to be baked are transported through the baking chamber and to the delivery opening by an endless conveyor 5 mounted on suitable sprockets positioned adjacent the end walls of the oven and driven by means, not shown.

6 designates a form of discharge device with which ovens of the type referred to are commonly provided, the same comprising a plate or support which extends in an upwardly inclined direction through the delivery opening 4, and into position to have the baked articles automatically delivered thereto by the conveyor.

As shown, the flights of the conveyor are of suitable sheet metal, and so connected to the chains of the conveyor as to provide a substantially continuous flat surface on the upper run of the conveyor, whereby it is adapted to support pans containing the articles being baked or to have such articles supported directly thereon as is desired in baking certain products.

The arrangement so far described is similar to ovens in common use, and there can, of course, be great variation in the details of the parts referred to, so that they are not herein more particularly described nor shown in detail.

The discharging device of the present invention comprises a plate-like member 10 which is supported by two arms 11, 12, that are secured to the inner ends of rock shafts 13 mounted in bearings 14 projecting from the outer face of the end wall of the oven, above the delivery opening 4 therein. The plate 10 has at one edge a section 15, which is of less width than the body of the plate, so that it can be positioned to extend through the delivery opening 4 in the oven, and the free end of said reduced section is preferably bevelled or inclined, as shown at 16, so that when the plate is positioned to extend through the delivery opening of the oven, its end within the baking chamber will slightly overlap a portion of the conveyor 5.

When the oven is being used for baking bread, for example, the discharge device of the present invention will be positioned as shown in full lines in Figure 2, wherein the plate 10 is relatively remote from the oven and in a position where its lower edge is above the plane of the upper edge of the delivery opening 4. The device is retained in this position by the action of counter-weights 20 connected by arms 21, with the rock shafts 13 and with the parts in this position, it will be seen that articles discharged from the conveyor will be received on the inclined chute or delivery device 6, and thereby carried through the delivery opening to a suitable table, or to a position where an attendant can remove the same.

When the oven is to be used for baking rolls, pies, cakes or similar articles, the parts are adjusted into the position shown in dotted lines in Fig. 2, in which the plate 10 is substantially horizontal and overlies slightly the conveyor adjacent the delivery end of the oven. With the parts in this position, the articles delivered by the conveyor will be delivered by the conveyor onto the discharge plate 10 without being subjected to any jar or material vibration.

The articles may be removed from the plate 10 directly by an attendant or by the use of a suitable peel.

It is believed that the operation of the invention and the advantages thereof will be readily appreciated from the foregoing description. The invention provides very simple means by which a baker's oven intended primarily for baking bread may be employed for baking other products, and when it is desired to use the oven for baking bread, the auxiliary discharge device may be readily turned into the position shown in full lines in Figure 2, in which it is entirely out of the path of the articles discharged from the conveyor. The attachment can, therefore, be a permanent part of the oven, as it does not in any way interfere with the ordinary operation thereof in baking bread, but enables the baker to readily adapt it for baking pies, cakes, etc., if desired.

I claim:—

1. In a baker's oven, the combination with a baking chamber having a delivery opening in an end wall, an endless conveyor for transporting articles within the baking chamber and to said opening, and an article delivery means extending in an inclined direction through said delivery opening and adapted to have articles automatically deposited thereon by the conveyor, of a supplemental delivery device comprising a plate supported by the oven and adapted to be bodily moved to and from a position in which it extends through said opening above the said inclined delivery means, so that articles will be delivered thereon from the conveyor, and means for holding said supplemental device in a position where it will not obstruct the delivery opening when it is withdrawn from the baking chamber.

2. In a baker's oven, the combination with a baking chamber having a delivery opening in an end wall, an endless conveyor for transporting articles within the baking chamber and to said opening, and an article delivery means extending in an inclined direction through said delivery opening and adapted to have articles automatically deposited thereon by the conveyor, of a supplemental delivery device comprising a plate and two arms attached to said plate and pivotally connected to the oven, whereby said device may be bodily moved to cause the plate to extend through the delivery opening of the oven to receive articles from the conveyor or to a position outside of the oven and above the horizontal plane of the delivery section of the conveyor.

3. In a baker's oven, the combination with a baking chamber having a delivery opening in an end wall, an endless conveyor for transporting articles within the baking chamber and to said opening, of a delivery device comprising a plate and two arms attached to said plate and pivotally connected to the oven, whereby said device may be bodily moved to cause the plate to extend through the delivery opening of the oven to receive articles from the conveyor or to a position outside of the oven and above the horizontal plane of the delivery section of the conveyor, and means connected with said arms for retaining the delivery device in either of said positions.

4. In a baker's oven, the combination with a baking chamber having a delivery opening in an end wall, an endless conveyor for transporting articles within the baking chamber and to said opening, of two rock shafts mounted in the outer face of the end wall of the oven in which the delivery opening is formed, arms connected to said shafts, a plate carried by said arms and adapted to be positioned to extend through the delivery opening to receive articles from the conveyor, or entirely outside the oven out of the path of articles passing through said opening, and counterbalance weights secured to said shafts for retaining the plate in its last said position.

5. In a baker's oven, the combination with a baking chamber having a delivery opening in an end wall, an endless conveyor for transporting articles within the baking chamber and to said delivery opening, and a discharging means extending in an inclined direction through the delivery opening to have articles automatically deposited thereon by the conveyor, of an auxiliary device including a plate pivotally supported by the oven and adapted to be bodily swung to and from a position where it will extend substantially horizontally through the delivery opening above said discharging means to receive articles from the conveyor.

6. In a baker's oven, the combination with a baking chamber having a delivery opening in an end wall, an endless conveyor for transporting articles within the baking chamber to a point adjacent said delivery opening, and relatively fixed article delivery means extending in an inclined direction through said delivery opening so that normally baked articles will be automatically deposited thereon by the conveyor, of means supported independently of the conveyor and adapted to be adjusted to extend through said delivery opening above the fixed delivery means to receive articles from the conveyor.

7. In a baker's oven, the combination with a baking chamber having a delivery opening in an end wall, an endless conveyor for transporting articles within the baking chamber to a point adjacent said delivery opening, and relatively fixed article delivery means extending in an inclined direction through said delivery opening into the oven to normally have baked articles automatically deposited thereon by the conveyor, of a support for baked articles supported at points outside the delivery end of the oven and bodily movable to and from a substantially horizontal position in the oven delivery opening where it will receive baked articles discharged by the conveyor.

8. In a baker's oven, the combination with a baking chamber having a delivery opening in an end wall, an endless conveyor for transporting articles within the baking chamber to a point adjacent said opening, and article delivery means extending in an inclined direction through said delivery opening so that baked articles will normally be automatically deposited thereon by the conveyor, of a supplemental delivery device comprising a support for baked articles mounted to turn about a horizontal axis adjacent the delivery end of the oven to and from a position where it will extend through said opening above the inclined article delivery means and constitute a substantially horizontal extension of the conveyor on which baked articles discharged by the conveyor will be received.

9. In a baker's oven, the combination with a baking chamber having a delivery opening in an end wall, an endless conveyor for transporting articles within the baking chamber to a point adjacent said delivery opening, and a relatively fixed plate extending in an upwardly inclined direction through said opening into position to have baked articles automatically deposited thereon by the conveyor, of an auxiliary support for baked articles comprising a plate provided at opposite edges with supporting arms, and connections between said arms and the delivery end of the oven, whereby said auxiliary support may rock about a horizontal axis into and from a position where it will extend through the delivery opening of the oven, above the fixed inclined delivery means and receive baked articles directly from the conveyor.

In testimony whereof I have hereunto set my hand.

CORRY B. COMSTOCK.